195-394 SR
FI-5104 AR RE 26,117
CROSS REFERENCE SEARCH ROOM
TX 7-175

Nov. 29, 1966 J. A. AMORI Re. 26,117

FRUIT ORIENTING AND CUTTING SYSTEM

Original Filed Feb. 12, 1952 12 Sheets-Sheet 1

INVENTOR.
JOSEPH A. AMORI
BY Naylor & Neal
ATTORNEY

FRUIT ORIENTING AND CUTTING SYSTEM

Original Filed Feb. 12, 1952 12 Sheets-Sheet 2

Inventor
JOSEPH A. AMORI
By Naylor & Neal
Attorney

FRUIT ORIENTING AND CUTTING SYSTEM

Original Filed Feb. 12, 1952 12 Sheets-Sheet 3

Inventor
JOSEPH A. AMORI
By Naylor & Neal
Attorney

FRUIT ORIENTING AND CUTTING SYSTEM

Original Filed Feb. 12, 1952 12 Sheets-Sheet 4

Inventor
JOSEPH A. AMORI
By Naylor & Neal
Attorney

FRUIT ORIENTING AND CUTTING SYSTEM

Original Filed Feb. 12, 1952 12 Sheets-Sheet 5

Inventor
JOSEPH A. AMORI
By Naylor & Neal
Attorney

FRUIT ORIENTING AND CUTTING SYSTEM

Original Filed Feb. 12, 1952 12 Sheets-Sheet 6

INVENTOR.
JOSEPH A. AMORI
BY Naylor & Neal

ATTORNEY

FRUIT ORIENTING AND CUTTING SYSTEM

Original Filed Feb. 12, 1952 12 Sheets-Sheet 7

INVENTOR.
JOSEPH A. AMORI
BY Naylor & Neal

ATTORNEY

FRUIT ORIENTING AND CUTTING SYSTEM

Original Filed Feb. 12, 1952 12 Sheets-Sheet 8

INVENTOR.
JOSEPH A. AMORI
BY Naylor & Neal

ATTORNEY

FRUIT ORIENTING AND CUTTING SYSTEM

Original Filed Feb. 12, 1952 12 Sheets-Sheet 9

Inventor
JOSEPH A. AMORI
By Naylor & Neal
Attorney

FRUIT ORIENTING AND CUTTING SYSTEM

Original Filed Feb. 12, 1952 12 Sheets-Sheet 10

Inventor
JOSEPH A. AMORI
By Naylor & Neal
Attorneys

FRUIT ORIENTING AND CUTTING SYSTEM

Original Filed Feb. 12, 1952 12 Sheets-Sheet 11

INVENTOR.
JOSEPH A. AMORI
BY Naylor & Neal

ATTORNEY

FRUIT ORIENTING AND CUTTING SYSTEM

Original Filed Feb. 12, 1952 12 Sheets-Sheet 12

INVENTOR.
JOSEPH A. AMORI
BY Naylor & Neal
ATTORNEY

United States Patent Office

Re. 26,117
Reissued Nov. 29, 1966

26,117

FRUIT ORIENTING AND CUTTING SYSTEM

Joseph A. Amori, 1596 Davis St., San Jose, Calif.

Original No. 2,827,089, dated Mar. 18, 1958, Ser. No. 508,457, May 16, 1955, which is a division of Ser. No. 271,134, Feb. 12, 1952, now Patent No. 2,713,934, dated July 26, 1955. Application for reissue Apr. 19, 1966, Ser. No. 548,023

3 Claims. (Cl. 146—73)

Matter enclosed in heavy brackets [ ] appears in the original patent but forms no part of this reissue specification; matter printed in italics indicates the additions made by reissue.

*This application is a divisional application based on my co-pending application, Serial No. 271,134, filed February 12, 1952, now Patent No. 2,713,934. The application for Patent No. 2,713,934 was co-pending with and a continuation-in-part of my application, Serial No. 691,708, filed August 20, 1946, now abandoned.*

This invention relates to fruit handling apparatus and more particularly to a fruit pitting machine adapted to receive tri-diametral ovaloid fruit, such as apricots and other freestone fruit of generally similar shape, and so orient the fruit while it is being moved toward rotary knives that the fruit will be disposed in a plane at a right angle to its smallest or cheek-to-cheek diameter and will be rotated end over end in said plane, i.e., about its shortest axis, to bring the entire suture line of the fruit into the path of rotation of the cutting edge of a rotary knife. [This application is a divisional application based on my co-pending application, Serial Number 271,134, filed February 12, 1952, now Patent No. 2,713,934.]

An object of the invention is to provide a fruit pitting machine embodying novel means for selectively receiving and selectively delivering fruit to a pocket type fruit conveyor.

Another object of the invention is to provide a pocket type fruit conveyor embodying fruit orienting means specifically and especially adapted to receive tri-diametral ovaloid fruit and, regardless of the initial position of said fruit in the conveyor, apply unbalanced rotational forces to the fruit in such manner that the fruit will be caused to rotate with its suture line undeviatingly disposed in a vertical plane.

A further object of the invention is to provide a fruit pitting machine embodying a freely suspended rotary knife operable to cut the meat of fruit brought therebeneath and to rise upon encountering the stone of said fruit, with the arrangement of the knife being such that its apparent weight during rotation, such apparent weight being the measure of resistance to the raising of the knife when the same encounters a fruit stone, decreases in proportion to increases in the rotational velocity of the knife.

A further object of the invention is the provision of a fruit pitting machine embodying the combination and subcombinations of means for selectively receiving and delivering the fruit, fruit orienting means and fruit cutting means, all of said means being accordant with the respective means as broadly set forth in the above-recited objects.

Other objects and advantages of the fruit pitting machine of the invention will be apparent from the following description taken in conjunction with the drawings forming part of the specification, and in which:

FIGURE 1 is a semi-schematic overall view in side elevation of the fruit pitting machine;

FIGURES 1A, 1B and 1C are enlarged detail views of, respectively, the lower, or input end of the machine, the intermediate portion of the machine, and the upper, or output, end of the machine, said views being in side perspective, being taken from the side of the machine opposite to that shown in FIGURE 1, and said views constituting in sequence a panoramic perspective development of the machine;

Figure 5:
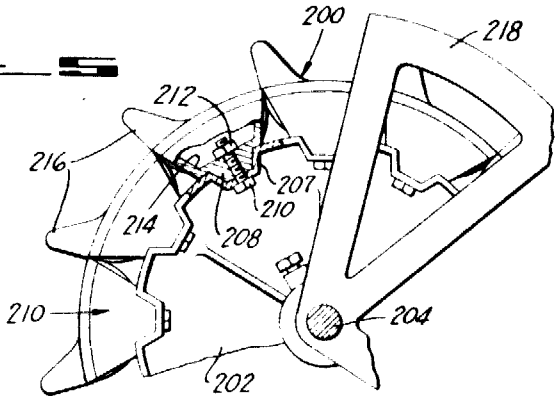
FIGURE 5 is a partial side view, partially in section, of the feed indexing drum of the machine.

Broadly, the fruit pitting machine of the invention comprises, first, a fruit feed and indexing system operable to selectively receive fruit from a conveyor and deliver the fruit in ordered sequence at a predetermined locus; secondly, a conveyor movable in timed sequence with the indexing element of the feed system to pick up the fruit at said predetermined locus and positionally orient the fruit by the application of unbalanced rotary forces applied by rotational elements peculiarly adapted to change the position of tri-dimetral ovaloid fruit from any initial position to a position in which the fruit is positively constrained to a path of rotary movement in which its suture line is in a vertical plane; and, thirdly, a fruit cutting system comprising vertically disposed annular knives beneath which the fruit is brought in its constrained position of uniformly oriented rotation, with each of said knives being adapted to slicingly engage the fruit about its entire peripheral suture line and automatically rise upon encountering the stone of the fruit. In the following description of the machine, the fruit orienting conveyor and its manner of operation will be described first, followed by the fruit cutting system and its mode of cooperation with the orienting conveyor, followed, in turn, by the fruit feed and indexing system and its mode of cooperation with the orienting conveyor.

The supporting framework (FIGURE 1) for the operating elements of the machine comprises opposed pairs of vertical members 10, 12 and 14 laterally and longitudinally braced, respectively, by members 16 and 18, and angularly braced by members 20, 22, 24 and 26. Tie members, such as 28, 30, 32, 34 and 36 add rigidity to the assembly of frame elements. Vertical end frame members 38 are connected to the main frame by members 18 and by members 40, and these members constitute a sub-frame for the support of drive assemblies hereinafter described. Frame members 12 are further connected together by members 42 which support a motor platform 44, and frame members 14 are connected at their upper ends by members 46. The entire supporting framework, as briefly described, may be formed of angle and channel iron members welded together.

THE FRUIT ORIENTING CONVEYOR

Figure 1A:
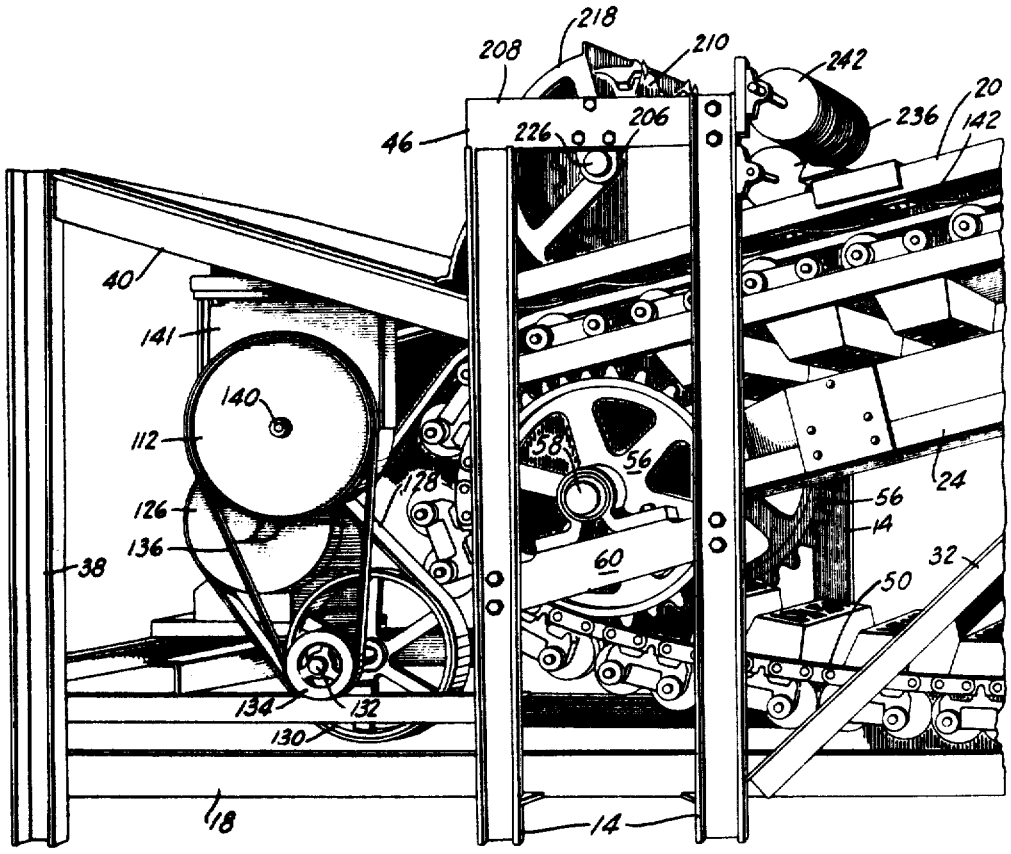
Figure 18:
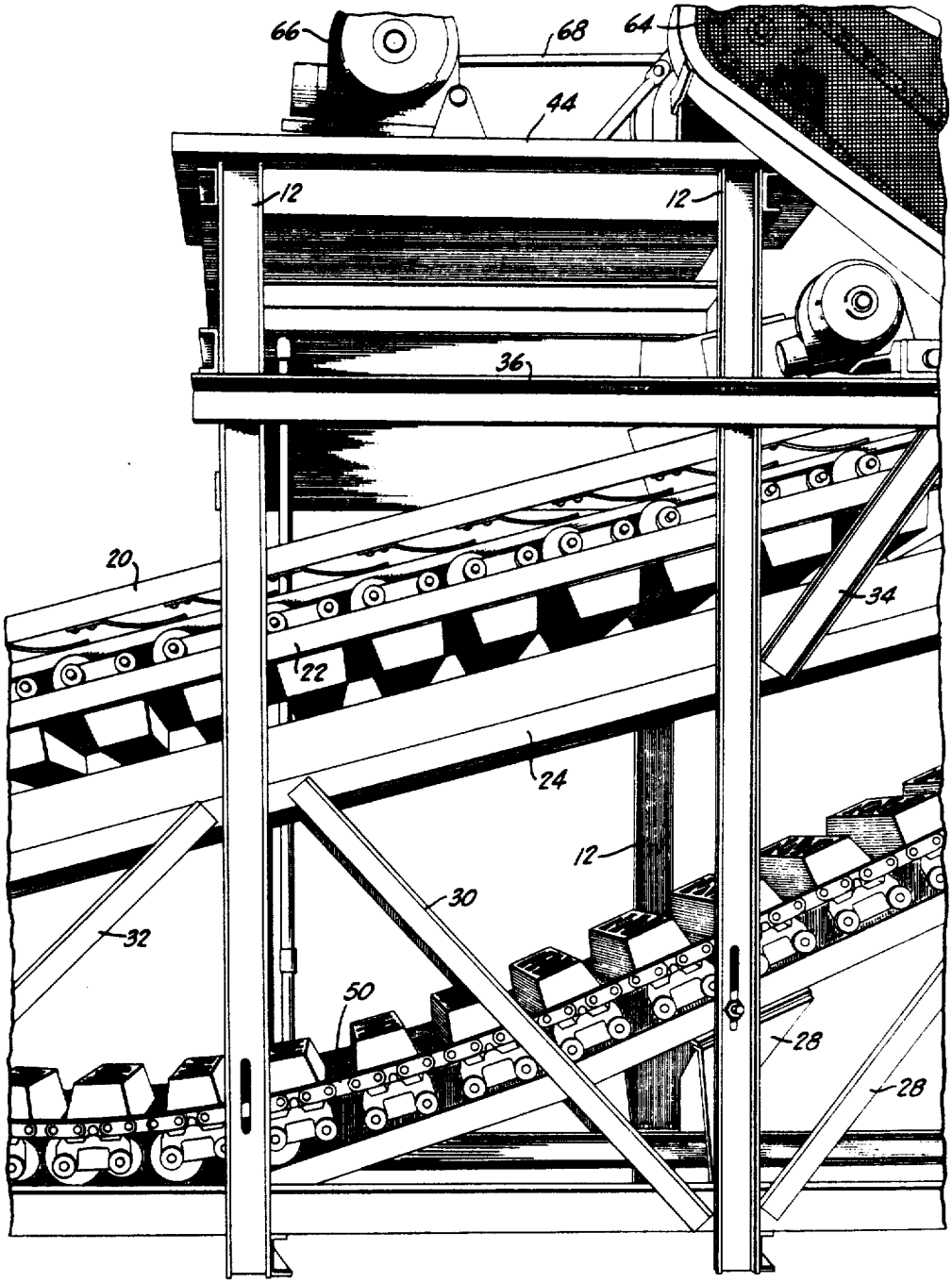
Figure 1C:
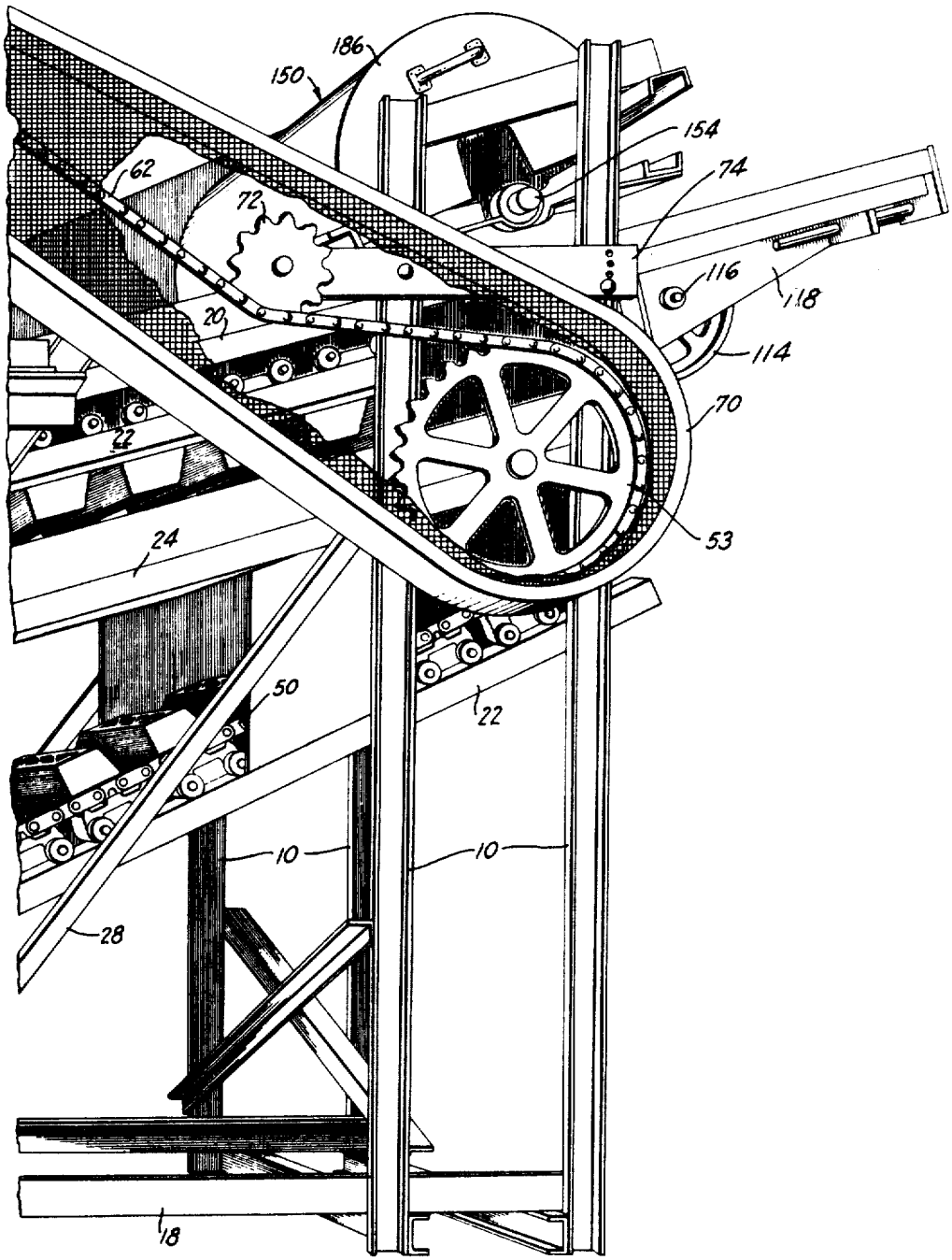
Figure 2:
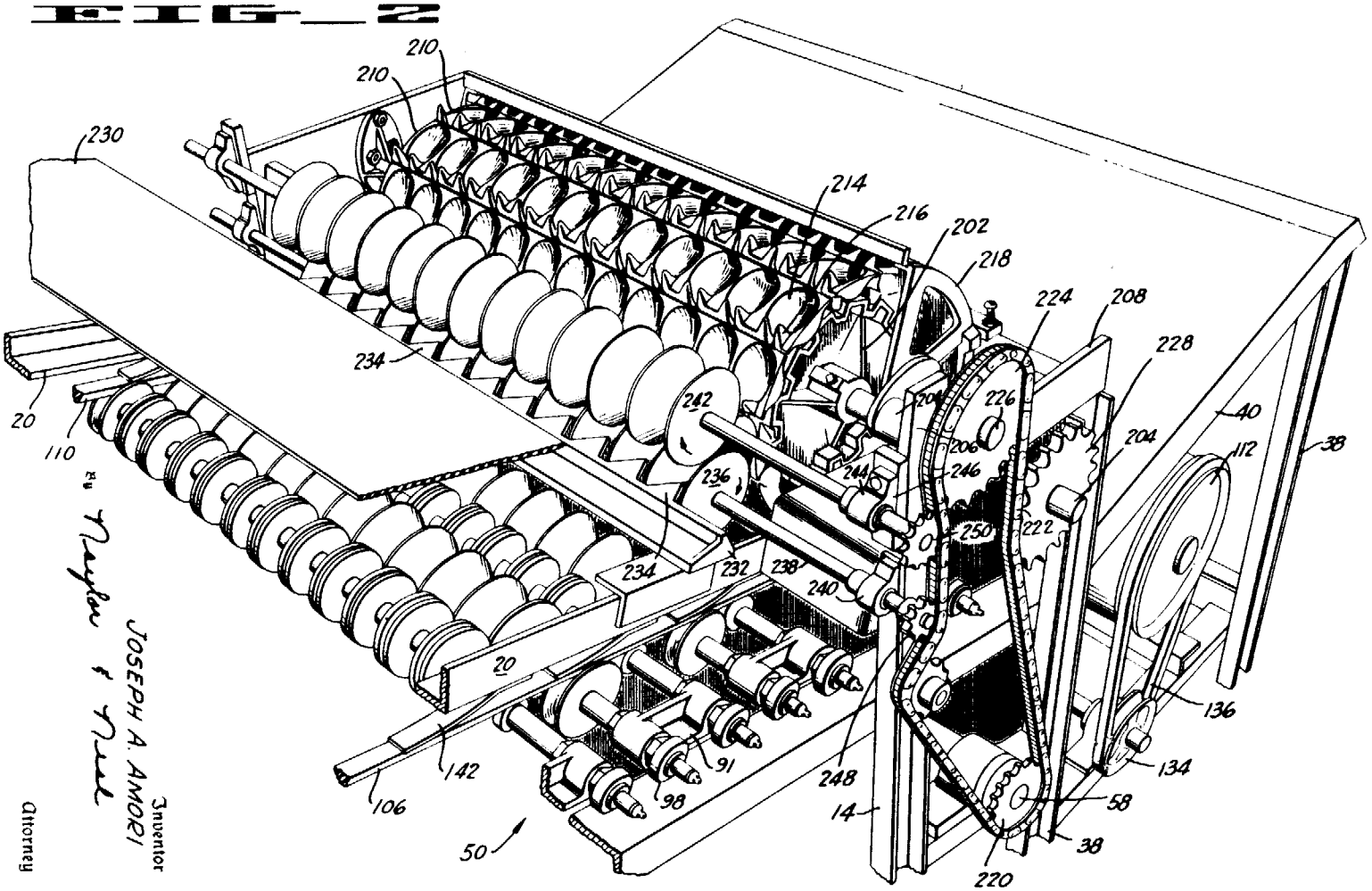
FIGURE 2 is a view in perspective of the feed end of the machine, said view being taken from a point above and to the left of said feed end and from the same side of the machine as FIGURE 1.
Figure 3:
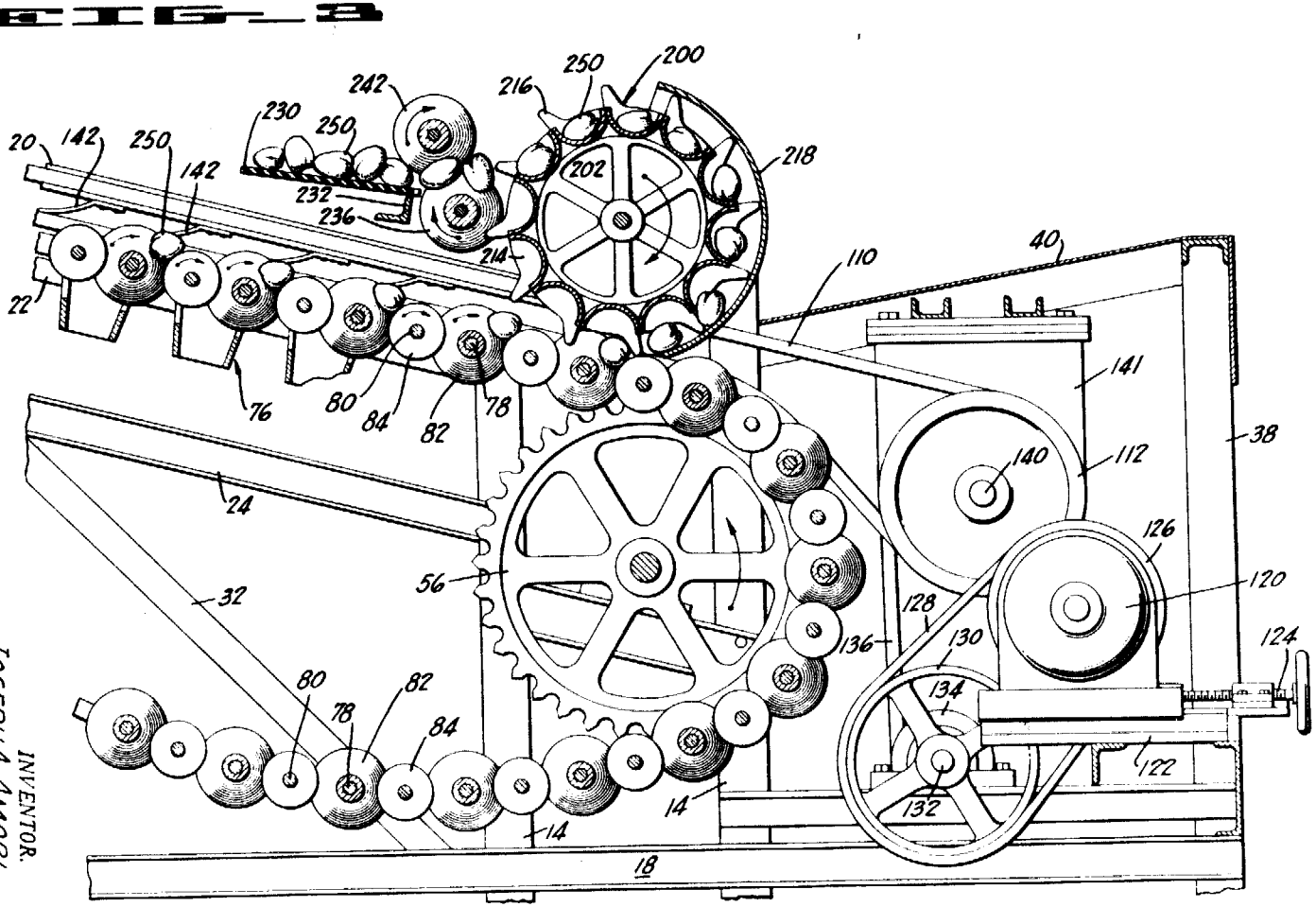
FIGURE 3 is a view in longitudinal section of the feed or input end of the machine showing the operational relationship of the input conveyor and feed indexing drum and the pocket type fruit orienting conveyor.
Figure 4:
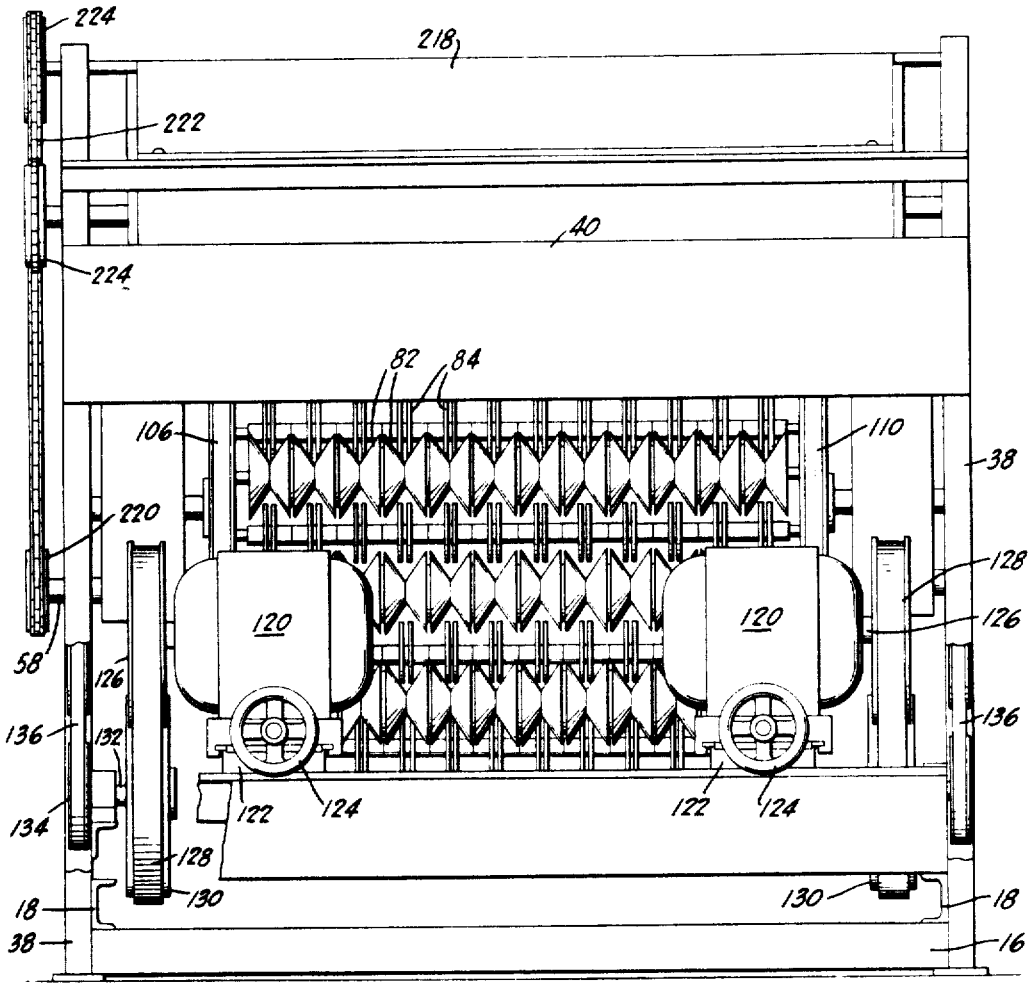
FIGURE 4 is a view in end elevation taken from the right hand side of FIGURE 3.

This conveyor is comprised of endless chain drives 50 passing over driver sprockets 52 carried by shaft 54 mounted for rotation on frame members 24 and over idler sprockets 56 carried by shaft 58 mounted for rotation on frame members 60 interconnecting frame members 14. Driver sprockets 52 are driven by chain drive 62 passing over sprocket 53 secured to shaft 54 and over sprocket 64 mounted for rotation on platform 44, and sprocket 64 is driven by a motor 66 through a belt connection 68. As indicated in FIGURES 1B and 1C, the chain drive 62 may be provided with guard 70, and with a tensioning sprocket 72 carried on pivotally adjustable arm 74.

Figure 9:
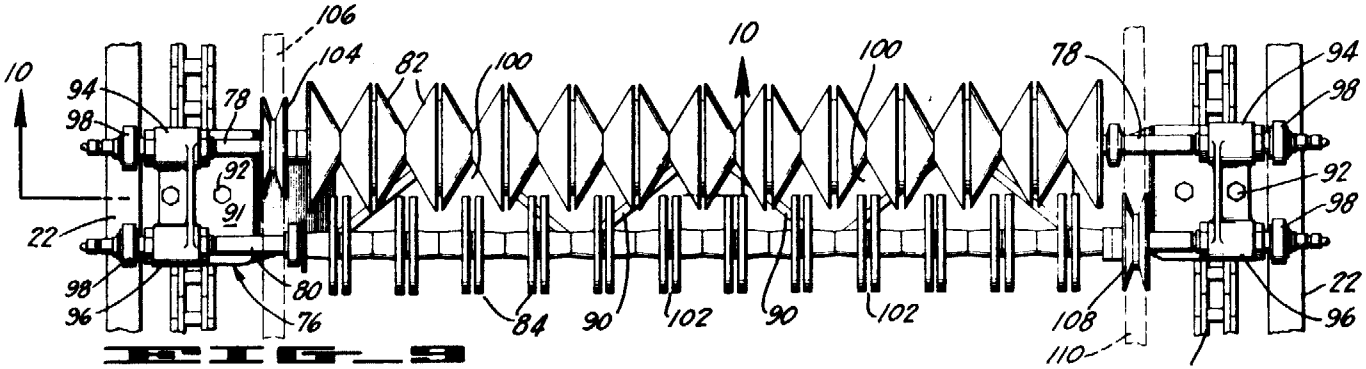
FIGURE 9 is a detail view in plan elevation of a sub-assembly constituting a row of fruit pockets for the fruit orienting conveyor of the machine.
Figure 11:
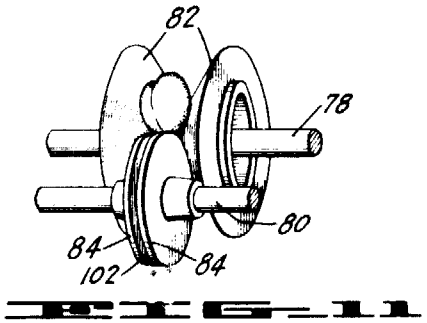
FIGURE 11 is a view in perspective of the elements of a fruit orienting pocket of the pocket type conveyor.
Figure 10:
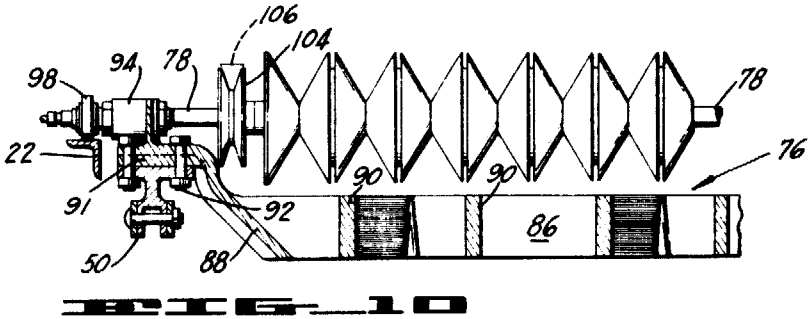
FIGURE 10 is a view in section taken along lines 10—10 of FIGURE 9.

Secured to the conveyor chains 50 at equi-spaced intervals is a plurality of cradle-like carrier members 76 (see FIGURES 9 and 10) forming rigid but relatively light supports for shafts 78 and 80 carrying, respectively, conical roller elements 82 and cylindrical roller elements 84. The members 76 are castings embodying side and end walls 86 and 88, with the side walls being interconnected by angularly directed reinforcing elements 90. The end walls of the members 76 have integral therewith ears 91 apertured for connection of the drive chains 50 at the underside thereof by means of bolts 92. The ears 91 are provided at their upper side with spaced bearing sleeves 94 and 96 forming journal supports for shafts 78 and 80.

Shafts 78 and 80 are provided at their outer ends with rollers 98 which travel on the frame elements 22 and 26 to lessen the load carried by the drive chains 50. The shafts 78 are provided with conical roller elements 82 fixed to the shaft, with each fruit roller unit being constituted by a pair of conical elements with their apices disposed toward each other. Such a fruit roller unit will be hereinafter referred to as a conical roller element. The shafts 80 are provided with cylindrical roller elements 84 fixed thereto, said elements extending within the open-based triangle formed by the conical roller elements to define with said conical roller elements an open bottom fruit pocket 100. The bottom of the pocket 100, or triangular space defined by the conical and cylindrical roller elements, is sufficiently small in area as to preclude the passage therethrough of the smallest of the species of tri-diametral ovaloid fruit to be processed in the machine. The cylindrical roller elements are provided with slots 102 so that these elements may freely pass the fruit cutter knives, hereinafter described, but as far as the orientation of the fruit is concerned the slotted rollers function precisely the same as they would in the absence of the slots.

Shafts 78 and 80 are provided with means to rotate them, and, preferably, the shafts 78 are driven independently of shafts 80 so that the relative speed of rotation between the conical and cylindrical roller elements may be variably controlled. For this purpose, the shafts 78 are provided at one end with fixed sheaves 104 over which a V-shaped belt 106 passes, while the shafts 80 are provided with fixed sheaves 108 disposed at their opposite ends, said sheaves being engaged by a V-shaped belt 110. Identical but independent drive systems are provided for the roller driving belts 106 and 110, and these drive systems may best be understood from FIGURES 1–4 and 15. From FIGURE 1 it will be seen that each belt passes around a driver sheave 112 and an idler sheave 114, with the latter being mounted on a stub shaft 116 carried by a bracket 118 which is adjustably secured to the frame for proper belt tensioning. The idler sheaves for the belts 106 and 110 are independently rotatable and independently adjustable. Each of the driver sheaves 112 is provided with an independent driving system (see FIGURES 1–4 and 15) comprising a reversible motor 120 slidably mounted on frame members 122 and adjustable through worm and yoke means 124 to decrease or increase the speed of the particular roller elements of the conveyor as the motor is moved forwardly or backwardly on the frame members 122, a sheave 126 driven by the output shaft of the motor, a belt drive 128 between sheave 126 and a sheave 130 mounted on a shaft 132 journalled on the frame, a sheave 134 mounted on stub shaft 132, a belt drive 136 connecting sheave 134 and a sheave 138 (FIGURE 15) mounted on the input shaft of gear reduction box 141 and driver sheave 112 mounted on the output shaft 140 of gear reduction box 141. The roller belts 106 and 110 are maintained in pressing engagement with their respective roller sheaves 104 and 108 as they travel thereover by leaf springs 142 carried at the undersides of frame members 20.

When motor 66 is energized to drive the roller conveyor, sprockets 52 and 56 rotate in a counterclockwise direction (FIGURE 1) to move the upper reach of the roller conveyor upwardly to the left. Before roller drive motors 120 are energized, it will be appreciated that the conical and cylindrical roller elements of the conveyor will be caused to rotate in a clockwise direction, opposite to the sense of movement of the conveyor as a whole, through rolling engagement of sheaves 104 and 108 on stationary belt 106 and 110. If, at this time, an apricot were to be placed in one of the fruit pockets, defined between a leading conical roller element and a trailing cylindrical roller element, at the lower end of the upper reach of the conveyor, it would be possible, depending on the speed of travel of the conveyor, and hence the speed of rotation of the roller elements, for the fruit to become oriented so as to be rotating with its suture line in a vertical plane by the time the fruit arrives at the upper end of the conveyor.

Figure 11A:
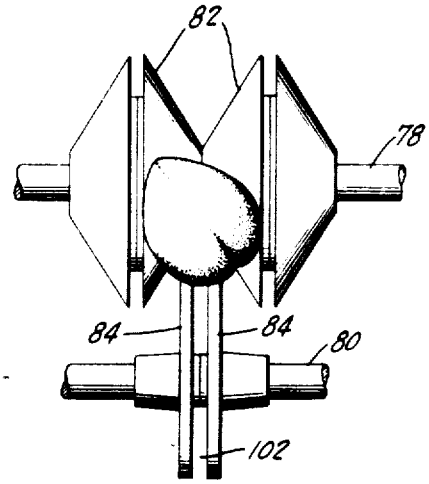
FIGURES 11A, 11B and 11C are detail views in plan elevation of the elements constituting a single fruit orienting pocket of the sub-assembly of FIGURE 9, showing respectively, a typical sequence of orientation of an apricot.
Figure 11B:
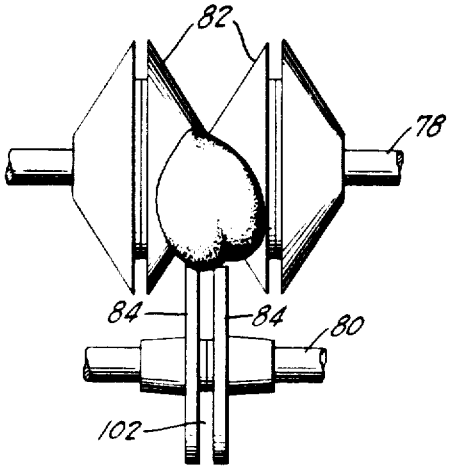
Figure 11C:
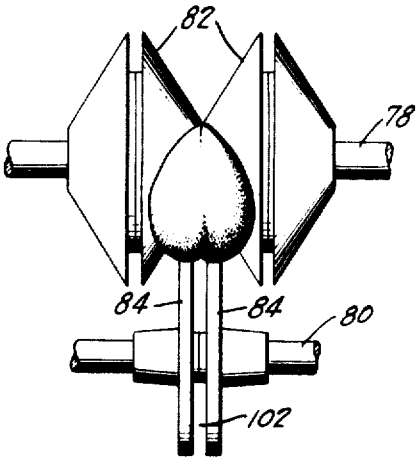

Such orientation takes place due to the critical relationship between the fruit pocket surfaces and the tri-diametral ovaloid form of the apricots, or similarly shaped fruit. A tri-diametral ovaloid fruit is to be distinguished from a simple ovaloid fruit in that planes passed through the form transverse to the longest or major axis intercept ovaloid sections, while in the latter, such planes intercept circular sections. When a fruit is in a roller pocket (FIGURES 11, 11A–11C) the divergent conical surfaces of roller elements 82 and the surface of cylindrical element 84 provide a three point support for the fruit. The triangle defined by the three points of support has its apex oppositely disposed to the apex of the triangle defined by the adjacent surfaces of elements 82 and 84. The function of the roller elements is to shift the points of support defining the mentioned triangle from a position (FIGURE 11A) where the defined triangle is non-isosceles in nature, i.e., asymmetrical with respect to a vertical plane passing through the centers of the roller elements to a position (FIG. 11C) where the point support triangle is an isosceles triangle which is symmetrical with respect to the vertical plane passing through the centers of the roller elements transverse to the axes thereof. Since an apricot, or other tri-diametral ovaloid fruit is symmetrical with respect to but one diametral plane passed through the fruit, e.g., a plane coincident with the suture line and the long, or blossom to stem, diameter, it will be appreciated that when the isosceles triangle point support pattern is achieved, the fruit will be oriented so that the suture line lies in the vertical plane which passes through the centers of the roller elements transversely to the axes of these elements.

It is essential that a three point support, as distinguished from any line-contact support, be provided for the fruit. Since any point on the surface of an apricot is a point on a curve, and since the surface of an apricot has a great number of curves, it will be appreciated that in order to obtain a point support, rather than a line support, accidentally or otherwise, the roller elements 82 and 84 must have geometrical forms which are generated by the 360° rotation of a planar element, the outer, or surface generating, side or edge of which is a straight line. If the surface generating side or edge of the planar element were concavely curvilinear, for example, then the compound curvature of the generated solid would produce, at some time, a line contact with the apricot; and such contact would tend to frustrate orientation of the fruit in the desired manner.

The described orientation function of the roller elements, such that the fruit is caused to rotate in a direction opposite to the direction of rotation of the roller elements, is caused by the differential in peripheral velocity of the double cone side of the fruit pocket and the cylindrical side. Thus with the elements 82 and 84 rotating in the same direction, and even at the same angular velocity, the cylindrical element, having a greater diameter than the conical roller element, will move relative to the fruit at a greater peripheral velocity than the conical element. Resultingly, the fruit will be caused to rotate in a direction opposite to the direction of rotation of the roller elements. A fruit which occupies any position in the fruit pocket other than the desired position of FIG. 11C will have a different rotational force applied to it by the conical roller element at its two points of support on said element. For example, when the fruit is in the position of FIG. 11A, or even in a more pronounced position, i.e., with its long axis parallel to the axes of rotation of the roller elements, the blossom end of the fruit will engage the roller at a point farther removed from the axis of rotation of the roller than the point of engagement between the broader, or stem, end of the fruit and the roller, wtih the result that the roller will tend to rotate the blossom end faster than the stem end. This unbalance of applied rotational forces causes a positional re-orientation of the fruit to the point where the rotational forces at the two points of engagement between the fruit and the roller are in balance, i.e., the fruit moves through the positions shown in FIGS. 11A and 11B to the desired position of 11C. After the fruit has reached this position, it will be positively constrained to rotate in this position by the balanced rotational forces acting upon it.

Figure 12:
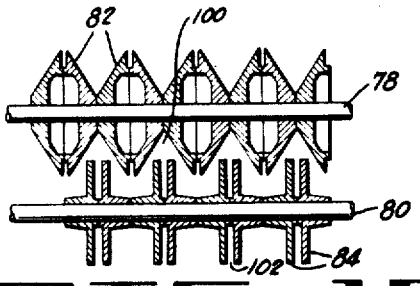
FIGURE 12 is a view in section of the rotational elements constituting fruit orienting pockets of the sub-assembly of FIGURE 9 said view being taken along a plane extending through the axes of rotation of the rotational elements.

As is indicated in FIG. 12, a view in section through the conical and cylindrical roller elements constituting a fruit pocket, with the view being taken along a plane in which the axes of rotation of the roller elements reside, those portions of the surfaces of elements 82 which are subtended by the adjacent surface of element 84 are constituted by straight lines, and each point on these lines is in closer proximity to the mid-point of the surface line of element 84. The fruit pocket is thus deeper, i.e., in a direction transverse to the axes of the pocket-forming roller elements, than it is wide. The rotational forces applied to a fruit thus tend to disturb the fruit continuously until it gravitates into the desired position of orientation in which its longest of three axes is aligned with the longer dimensional axis of the fruit pocket.

In the actual operation of the fruit pitting machine, the roller conveyor is driven at a rate of speed which is close to the maximum speed compatible with the time required for the specific size and shape of fruit to be fully oriented before it reaches the upper end of the conveyor run. While apricots, and similarly shaped fruit, are tri-diametral ovaloids in the generic sense, it will be understood that the specific form and size of different grades and lots of fruit will vary, thus requiring a shorter or a longer period of time, as the case may be, for complete orientation. The rate of travel of the roller conveyor is correlated with the orientation time period for the specific fruit being handled. Optimum orientation results from the standpoint of time required for orientation are obtained when the speed of rotation of the conical roller elements is maintained within the range of 60 to 80 r.p.m. at all times. If the speed of rotation of these elements exceeds about 80 r.p.m., the apricots will vibrate and may jump out of the desired alignment position, whereas if the speed of the conical roller elements falls below about 60 r.p.m., the aligning operation will be unduly retarded, thus requiring a slowing down of the rate of advance of the roller conveyor which in turn decreases the productive capacity of the machine. The speed of rotation of the cylindrical roller elements is preferably maintained within the range of 150–350 r.p.m., but the rate of rotation of the cylindrical rollers is not critical as long as it is greater than the rate of rotation of the conical rollers.

When the specific form and size of the fruit being processed enables a very rapid orientation of the fruit to the desired position for cutting, it will then be desired to speed the roller conveyor up to take advantage of the possibility of increasing its productive capacity per unit of time. It will be appreciated that the rate of advance of the roller conveyor may be increased for this reason to the point where the conical rollers would be rotated at a speed in excess of 80 r.p.m. even when the conical roller drive belt 106 is not being positively moved by motor 120 and associated belt drive system. In such event, in order to keep the speed of rotation of the conical rollers at 80 r.p.m. or below, it will be necessary to drive the belt 106 in the same direction as the direction of advance of the roller conveyor, thereby decreasing the relative velocity imparted to the conical rollers by belt 106, and for the same reason it may be necessary to drive the cylindrical roller rotating belt 110 in the direction of advance of the roller conveyor. In order that the relative rate of movement between the roller rotating belts 106 and 110 and the roller elements of the conveyor may be controlled in this manner, the motors 120 for the belts are reversible. Thus, regardless of the rate of advance of the roller conveyor, the two separate drive systems for the rollers are controlled so that both the conical and cylindrical roller elements will be rotated in a direction opposite the direction of advance of the roller conveyor with the rate of rotation of the conical rollers being maintained within the range of about 60 to 80 r.p.m., and preferably, with the rate of rotation of the cylindrical rollers being within the range of 150–350 r.p.m.

THE FRUIT CUTTING SYSTEM

Figure 6:
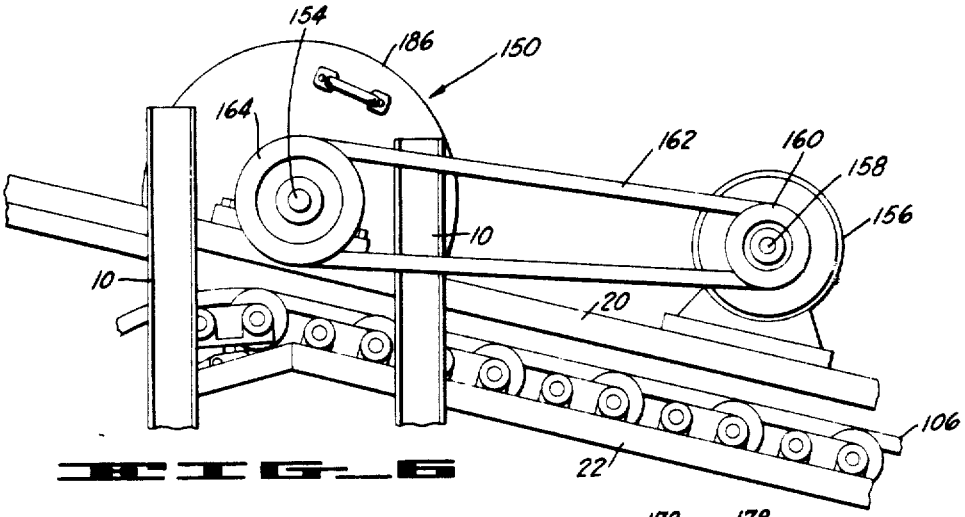
FIGURE 6 is a detail view in side elevation of the knife section of the machine.
Figure 7:
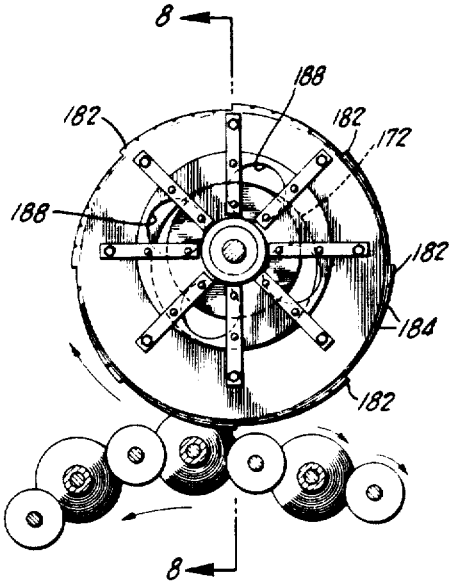

As the positionally oriented fruit reach the upper end of the roller conveyor run, they are being rotated in a counterclockwise direction, reference being had to FIGURES 1 and 6, about their cheek-to-cheek axis, i.e., with their suture lines disposed in a vertical plane. The fruit are then brought into association with the fruit cutting system, indicated generally at 150, to be halved. The cutting system is comprised of a plurality of knives 152, there being one knife for each of the rows of fruit pockets of the roller conveyor, spaced apart so that the knives are coincident with a vertical plane passing through the centers of the fruit pockets. The knives 152 are mounted on a shaft 154 which is mounted for rotation on frame members 20. A motor 156, mounted on frame members 20, is provided with an output shaft 158 having a sheave 160 in driving relation to a belt 162 which passes over sheave 164 carried by shaft 154. The knives 152 are driven in a clockwise direction (FIGURES 6 and 7) while the fruit are being rotated in a counter-clockwise direction as they are brought into engagement with the knives. Thus, at the points of engagements between the knives and fruit both are moving in the same direction.

Figure 7:
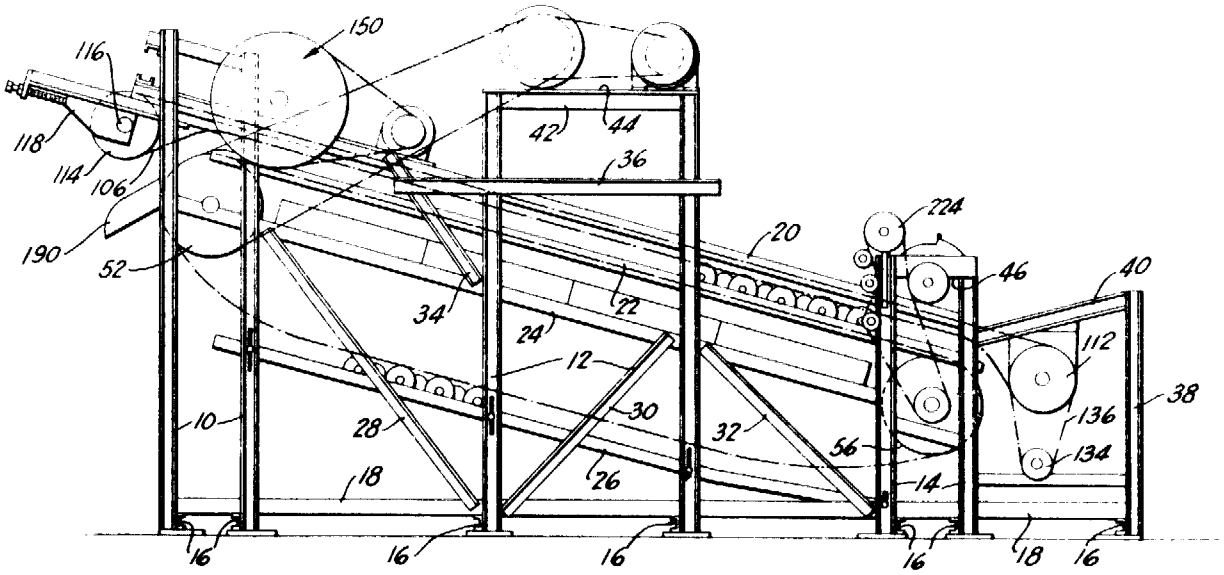
FIGURE 7 is a detail view in side elevation of the bank of rotary knives, showing the relationship of the same to the pocket type fruit conveyor.
Figure 8:
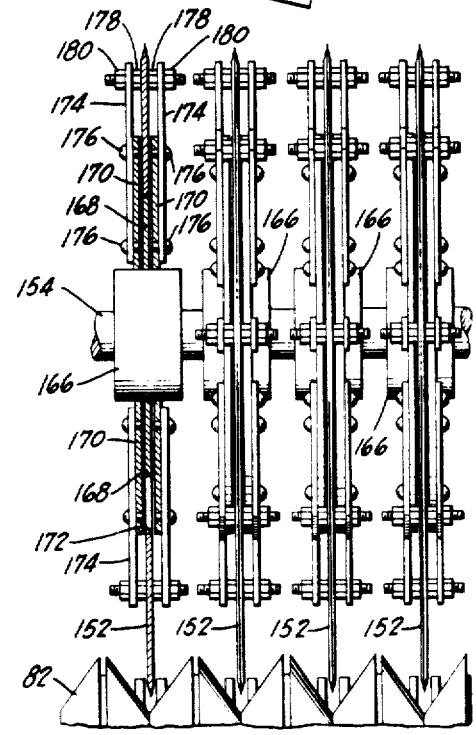
FIGURE 8 is an enlarged view in section taken along lines 8—8 of FIGURE 7.

The preferred form of the knives is shown in FIGURES 7 and 8. The knife shaft 154 is provided with a plurality of fixed hubs 166. Secured to the hubs 166 is an annularly shaped disc-like knife hub 168 and a pair of annular plate members 170 in embracing relation to the knife hub 168. Mounted on the hub 168 between plates 170 serving as guide members is the annular knife blade 152. The knife blade 152 has a centrally disposed aperture 172 having a diameter which is in substantial excess of the diameter of knife hub 168. As indicated in FIGURE 8, when the knife blade is suspended from the hub 168, the lower side of the blade aperture 172 is about at a level with the lowermost portions of plates 170. The space between the knife blade 152 and the knife hub 168 at the underside of the knife assembly constitutes the vertical distance through which the knife may be moved upwardly when it encounters some obstruction in the cutting operation.

The knife assembly is preferably provided with means to prevent lateral wobble of the knife blade during rotation and maintain it out of engagement with the guide plates 170, said means comprising a plurality of radially disposed pairs of arms 174 secured by studs 176 to the outer sides of plates 170. The arms 174 extend outwardly beyond the edges of plates 170, and each arm is provided at its outer end with a brass headed bolt 178 secured to the arm by a nut 180. The brass heads of the bolts 178 constitute bearing points for the knife blade 152 to maintain the knife blade at all times in a vertical plane.

The peripheral or cutting edge of the knife is spirally undercut, as shown in FIGURE 7, to provide the biased or shoulder-like cutting teeth 182. Additionally, the periphery of the knife blade is provided with a plurality of small notches 184 to better adapt the knife blade to the cutting through of the skin of the fruit fed to it.

As was previously indicated, the fruit and blades 152 are rotated in opposite directional senses, and thus the rotation of the blades does not oppose the rotation of the fruit, as caused by the roller elements 82 and 84. This insures that the entire suture line periphery of the fruit will be sliced by the high speed cutting blade.

The knife blade is caused to rotate by the frictional engagement between the blade hub 168 and the blade, with the frictional engagement being in proportion to the weight of the blade. As the blade is brought into full rotation at the speed desired, it maintains its attitude of suspension from the top of hub 168, but as the speed of the blade increases, the apparent weight of the blade decreases due to the rotational force component which acts in opposition to the weight component of the blade, thus tending to lift the blade. Thus at operational speeds of the blade, as for example 750 r.p.m., the apparent weight of the blade is so reduced that upon encountering the stone of the fruit in the cutting operation the blade will be swung upwardly and outwardly opposite to the direction of travel of the fruit to ride over the stone without in any way damaging the meat of the fruit which lies between the stone and the underlying roller elements of the fruit conveyor.

The rotary knives are provided with a removable hooded housing 186 during operation, said housing serving to entrap any fruit juice and fruit shreds which may be thrown off and to contain the spray water which is applied to the knives, by means not shown, to maintain the knives in a wet condition and thus prevent the accumulation thereof sugar and other sticky deposits which would tend to disturb smooth operation of the knives. In order to enable the efficient washing of the knives, the guide plates 170 are provided with a plurality of apertures 188. Wash water entering these apertures is thrown outwardly by the centrifugal force of the rotating knife assembly to wash the inner faces of knife hub 168, guide plates 170 and the knife blade.

After the fruit have passed under the knives, the fruit halves and stones are delivered to an outlet chute 190 as the roller conveyor passes around its driver sprocket 52.

FRUIT FEED AND INDEXING SYSTEM

The fruit pitting machine is provided with a fruit feed and indexing system, now to be described, which has for its purposes: the positive feeding of a fruit into every fruit pocket of the roller conveyor constituted by a leading conical roller element and a trailing cylinder element; and the preventing of the feeding of fruit into the nonfunctional pocket spaces defined between leading cylindrical elements and trailing conical elements of the roller conveyor. The fruit feeding and indexing system further embodies means for achieving these recited purposes regardless of the size and specific contour of the tridiametral ovaloid fruit being processed.

The fruit feed and indexing system (FIGURES 2, 3 and 5) comprises an indexing drum indicated generally at 200. The drum 200 consists of end wheels 202 secured to shaft 204 journalled in support brackets 206 carried by frame members 208 interconnecting the upper ends of frame members 14. The peripheries of the end wheels 202 are provided with a plurality of spaced inwardly directed open ended bosses 207 which receive complementary bosses 208 carried at the ends of horizontal bar members indicated generally at 210. The horizontally disposed bar members 210 consitute the surface of the indexing drum, and these bar members are secured to the end wheels 202, as by screws 210 extending through complementary bosses 208, 207 and secured in place by nuts 212. Each of the bars 210 is formed with a plurality of pockets 214 corresponding in number and in alignment with the described fruit pockets of the roller conveyor. The bars 210 are further provided with a plurality of lips 216 at the lower sides of the pockets 214. The function of the pocket type indexing drum 200 is to pick up fruit (FIGURE 3) by means of the lip extensions 216 as these extensions sweep upwardly as the drum is rotated in a clockwise direction, and to deposit the fruit at the bottom of the circular path of movement of the drum pockets 214 in the aligned row of roller conveyor fruit pockets defined by leading conical roller elements 82 and trailing cylindrical roller elements 84. For this purpose the drum 200 is provided with a substantially semi-circular hood which prevents the fruit from falling off and away from the drum as the fruit pockets are turned over as the drum rotates. In order that the indexing drum 200 may be rotated in timed relation with the movement of the roller conveyor to deposit the fruit within the proper fruit pockets of the roller conveyor, means are provided to drivably interconnect the drum 200 with shaft 58 which carries the idler sprockets 56 for the roller conveyor. Shaft 58 is provided with sprocket 220 drivably engaged with chain 222 which passes over idler sprocket 224 mounted on stub shaft 226 supported for rotation by frame element 208. Chain 222 drives sprocket 228 mounted on shaft 204 carrying drum 200. Sprocket 220 rotates in a counterclockwise direction, reference being had to FIGURE 2, and thus sprocket 228 and drum 200 are driven in a clockwise direction.

The feeder system for the indexing drum 200 comprises a conveyor belt 230 extending transversely across the machine, with the inner side edge of the conveyor belt 230 being substantially flush with the upper end of a bracket member 232 having integral therewith a plurality of triangular baffle extensions 234. The triangular members 234 extend between pairs of inwardly disposed conical roller elements 236 carried by shaft 238 journalled for rotation in bearing members 240 carried by frame members 14. The row of conical roller elements carried by shaft 238 corresponds in form to and is in alignment with the rows of conical roller elements 82 carried on shaft 78 of the main roller conveyor, and extension members 234 constitute a baffle preventing the fruit from passing downwardly between the inwardly disposed pairs of conical elements 236 from the feed belt 230.

The machine is provided with a second row of conical roller elements 242 carried by shaft 244 journalled in bearing members 246 carried by frame members 14. The conical roller elements 242 are located immediately above and slightly forwardly of the elements 236, and they are similar in form thereto and in alignment therewith. Roller shafts 238 and 244 are rotated, respectively, by sprockets 248 and 250 which are driven by chain 222. Rollers 236 and 242 are rotated in clockwise direction.

The feed belt 230 is inclined toward the rollers 236 and 242 so that when the apricots 250, or other tri-diametral ovaloid fruit, are brought over the machine they roll off of the belt 230 and onto the triangular members 234. The fruit are then urged by rotative movement of roller elements 236 to pass through the diamond shaped spaces defined between the upper and lower sets of roller elements 236 and 242. These diamond shaped spaces are sufficiently large to comfortably pass a fruit without causing the fruit to be brought into engagement with the upper row of rollers 242. However, when more than one fruit is urged to pass between any of the pairs of upper and lower elements the upper fruit is brought into engagement with roller elements 242, and since these elements have their lower sides moving in a direction opposite to the direction in which the fruit tends to be forced to travel the uppermost fruit is urged outwardly from between the rollers 236 and 242. In this manner, the rollers tend to limit the passage therebetween to a single fruit at a time, and thus the pocket lips 216 of the indexing drum each pick up a single fruit at the output side of each double cone element of roller 236.

Figure 13:
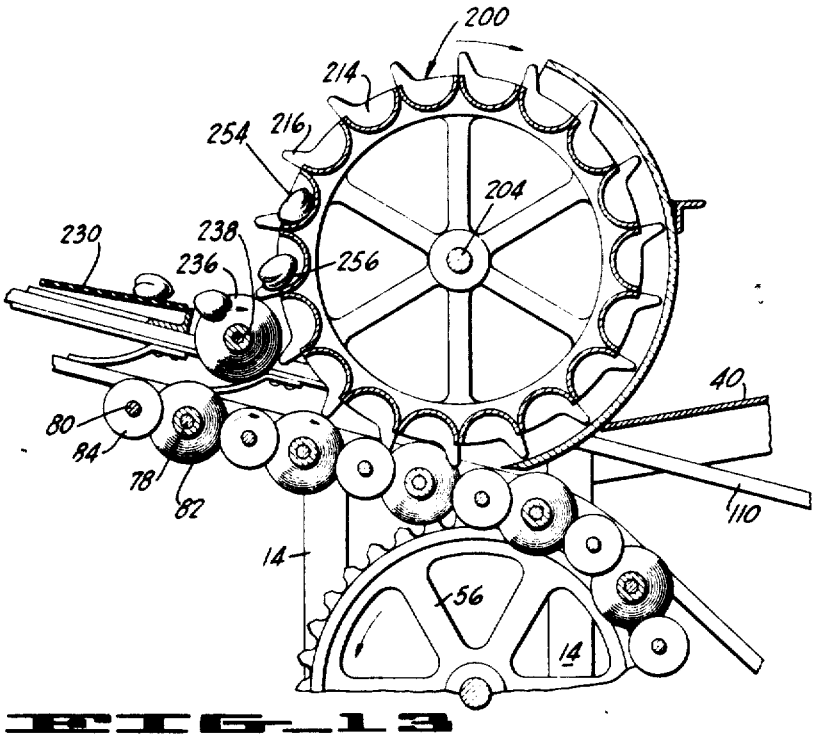
FIGURE 13 is a semi-schematic view in side elevation of a modification of the input feed system of the machine.

A modified form of the feed system for the indexing drum 200 is shown in FIGURE 13 with elements corresponding to those previously described being indicated by similar reference numerals. In the modification of FIGURE 13 the upper bank of feed rollers 242 has been eliminated, such elimination being made possible by varying the angle of incidence of the pickup lips 216 at the point at which the fruit is picked up from the output side of feed rollers 236. In the structural arrangement of FIGURE 13, the drum 200 is made larger in diameter, being provided with a greater number of horizontal pocket rows and the shaft 204 for the drum has been repositioned with respect to the shaft 238 carrying rollers 236 to locate the shaft 204 a greater distance both horizontally and vertically from shaft 238. Thus, in the previously described modification of the structure (see FIGURE 3) each drum pocket 214 which was in a fruit receiving position was located in the upper left hand quadrant of the drum, while in the case of the modified structure of FIGURE 13, each pocket 214 is in the lower left hand quadrant of the drum at the point at which the fruit pickup lips 216 receive the fruit. If the fruit being processed is particularly small in size, two of the fruit could be contained in a pocket 214 of drum 200. Since, in the feed system of FIGURE 3, the pockets 214 are moving upwardly and away from feed roller 236 at the point of fruit pickup the fruit immediately goes to the bottom of the pocket, and hence if too small fruit were made available to any pocket they would enter and occupy the pocket. The provision of upper feed rollers 242 limits the admission of fruit to the drum in the manner previously described to allow but one fruit at a time to be moved into a position where it can be picked up by the lips 216.

Figure 14:
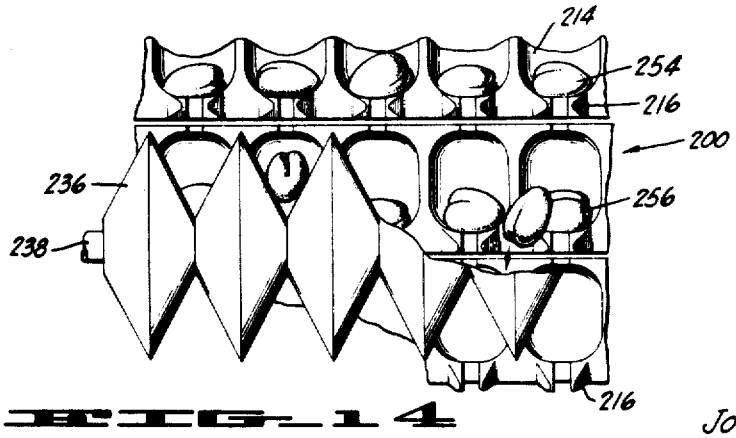
FIGURE 14 is a detail view in front elevation showing a limited number of fruit pockets of the feed indexing drum of FIGURE 13 at the instant of fruit pickup.

In the modified system of FIGURE 13, the pockets 214 are still semi-inverted at the time when the pickup lips 216 pick off the fruit from feed roller 236. The fruit does not gravitate to the bottom of the pooket until the pocket reaches a position such as that indicated at 254 in FIGURE 13. When the pocket has reached this position it is of course then out of the fruit pickup zone. Until the pocket reaches a position in the upper left hand quadrant of the drum, in which position the fruit can gravitate to the bottom of the pocket, the fruit is carried upwardly on the lips 216, as indicated at 256. There is not sufficient room on the pocket lip for two fruit, and thus if two small fruit were presented in the position for pickup by the lip only one of the fruit would remain on the lip and the other would be deflected laterally to fall off the horizontal pocket bar through the space between adjacent lips, as indicated in FIGURE 14. The arrangement of the modification of FIGURE 13 is therefore such as not to require an upper row of feed systems for the machine, since the orientation of the drum pockets at the point of fruit pickup is such as to limit the loading of fruit to one per pocket.

Figure 15:
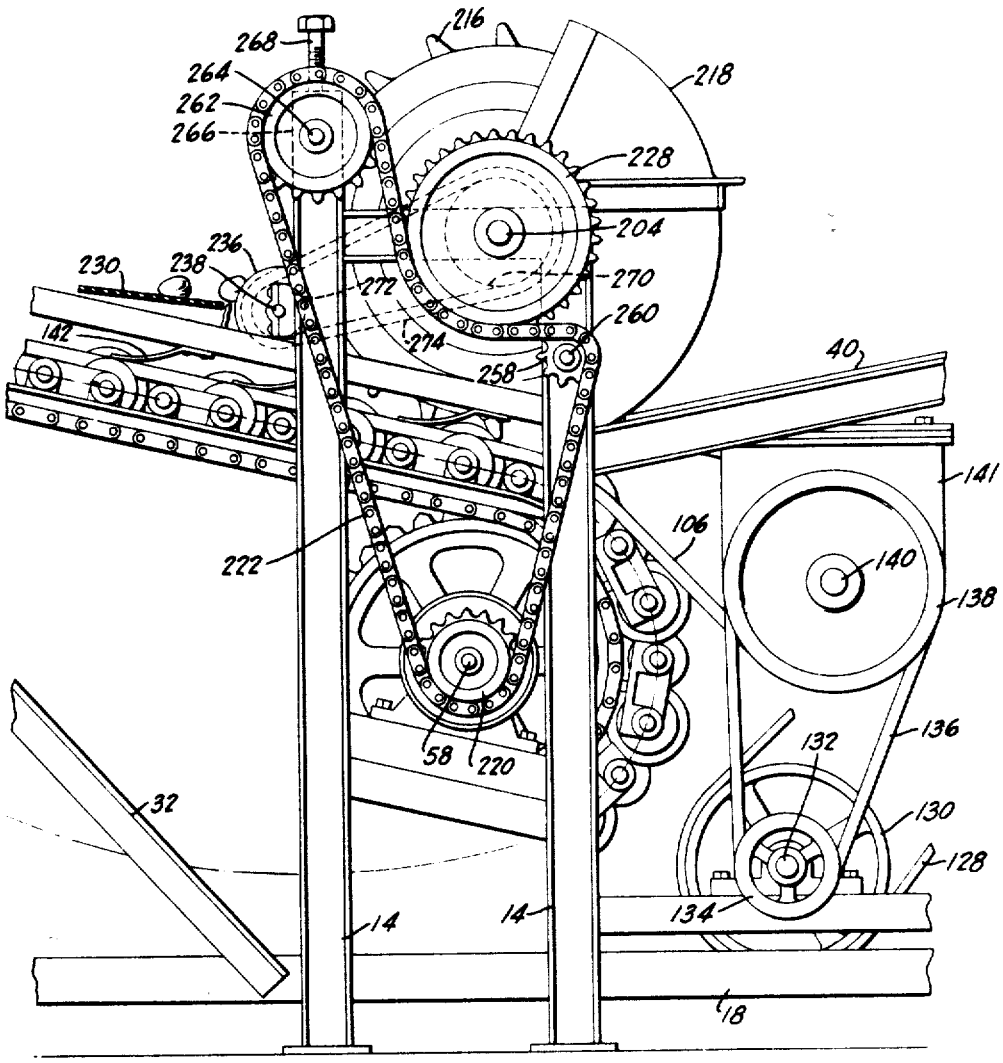
FIGURE 15 is a view in side elevation of the input end of the machine showing a preferred form of synchronized drive system for the modified input feed system of FIGURE 13 and the pocket type fruit conveyor.

The modified or single roller feed system of FIGURE 13 is provided with a modified drive connection with the roller conveyor, as indicated in FIGURE 15. The drive chain 222 passes around the driver sprocket 220, idler sprocket 258 mounted on stub shaft 260 carried by frame member 14, and idler sprocket 262 mounted on stub shaft 264 carried by take-up bracket 266 mounted on frame member 14. The bracket 266 is provided with a take-up bolt 268. Chain 222 is in driving engagement with the sprocket 228 mounted on drum shaft 204. The driving connection for shaft 238 of roller 236 is made at the opposite side of the machine, with this connection comprising sprocket 270 carried by shaft 204, sprocket 272 carried by roller shaft 238, and chain 274 connecting the sprockets 270 and 272.

While a preferred embodiment of the fruit pitting machine of the invention has been shown and described, it is to be understood that all substantial equivalent of said embodiment are within the scope of the invention.

What is claimed is:

1. A halving machine for tri-diametral ovaloid fruit comprising means for orienting a fruit so that its suture is in a vertical plane and means for cutting said fruit along its suture without engaging said orienting means, said first-mentioned means comprising a pair of parallel rotatable shafts, a pair of frusto-conical members mounted on one of said shafts with their apices disposed toward each other to present two spaced fruit-contacting surfaces, a cylindrical element positioned on the other of said shafts to present a fruit-contacting surface so located with respect to the two fruit-contacting surfaces presented by said frusto-conical members that the points of contact of fruit with said members and said element constitute the approximate apices of a substantially triangular figure, and means for simultaneously rotating said shafts; said second-mentioned means comprising a rotatable knife blade suspended above said orienting means and residing within the vertical plane in which the suture of the fruit is oriented, a knife-clearing slot in said cylindrical element in alignment with said knife blade, and means for moving said orienting means beneath said knife blade to engage the fruit with the blade.

2. An apricot halving machine comprising means for orienting whole apricots with their sutures in a substantially vertical plane and continuously rotating them while maintaining such orientation, in combination with halving mechanism comprising a freely suspended annular knife and means for effecting slicing movement thereof in a substantially vertical plane at a location with respect to said orienting means such as to effect cutting of the meat of an oriented and rotating apricot while permitting said suspended knife to rise upon encountering the seed thereof.

3. An apricot halving machine comprising an orienting device including a pair of parallel rotatable shafts, a pair of frusto-conical members mounted on one of said shafts with their apices disposed toward each other to present two spaced fruit contacting surfaces, a cylindrical element positioned on the other of said shafts to present a fruit-contacting surface so located with respect to the two fruit-contacting surfaces presented by said frusto-conical members that the points of contact of fruit with said members and said element constitute the approximate apices of a substantially triangular figure; said cylindrical element having a knife clearing slot in its fruit-contacting surface, and means for simultaneously rotating said shafts; in combination with halving mechanism including a freely suspended annular knife disposed above said orienting device, and means for effecting slicing movement of said knife in a vertical plane extending into said knife clearing slot.

References Cited by the Examiner

The following references, cited by the Examiner, are of record in the patented file of this patent or the original patent.

UNITED STATES PATENTS

| | | | |
|---|---|---|---|
| 1,605,532 | 11/1926 | Duncan | 146—238 |
| 1,755,872 | 4/1930 | Gotelli | 146—238 |
| 2,100,455 | 11/1937 | Souther et al. | 146—73 |
| 2,703,126 | 3/1955 | Amori | 146—73 |

FOREIGN PATENTS

| | | |
|---|---|---|
| 442,786 | 6/1912 | France. |

ANDREW R. JUHASZ, *Primary Examiner.*

W. GRAYDON ABERCROMBIE, *Examiner.*